United States Patent
Wang et al.

(10) Patent No.: US 11,956,849 B2
(45) Date of Patent: Apr. 9, 2024

(54) DISCONTINUOUS RECEPTION (DRX) CONFIGURATION FOR A USER EQUIPMENT (UE)

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/448,694

(22) Filed: Sep. 23, 2021

(65) Prior Publication Data

US 2023/0089416 A1    Mar. 23, 2023

(51) Int. Cl.
*H04W 76/28* (2018.01)
*H04W 76/10* (2018.01)
*H04W 92/18* (2009.01)

(52) U.S. Cl.
CPC ........... *H04W 76/28* (2018.02); *H04W 76/10* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 2021/0227620 A1* | 7/2021 | Pan | H04W 4/40 |
| 2021/0321329 A1* | 10/2021 | Tenny | H04W 76/28 |
| 2021/0400762 A1* | 12/2021 | Jeong | H04W 76/28 |
| 2022/0312543 A1* | 9/2022 | Wu | H04W 52/0216 |
| 2022/0353815 A1* | 11/2022 | Lin | H04W 52/0232 |
| 2023/0064488 A1* | 3/2023 | Han | H04W 76/28 |

FOREIGN PATENT DOCUMENTS

WO    WO-2021119474 A1 *  6/2021   ........ H04W 72/0406

* cited by examiner

*Primary Examiner* — Jamaal Henson
(74) *Attorney, Agent, or Firm* — Norton Rose Fulbright US LLP

(57) ABSTRACT

An apparatus includes one or more transmitters configured to transmit, from a first user equipment (UE) to a second UE, a sidelink discontinuous reception (DRX) setup request indicating a first DRX configuration of the first UE. The apparatus further includes one or more receivers configured to receive, from the second UE, a sidelink DRX setup response based on the sidelink DRX setup request and indicating a second DRX configuration. The one or more transmitters are further configured to transmit, to a first base station, an uplink message indicating the second DRX configuration, and the one or more receivers are further configured to receive, from the first base station, a downlink message indicating one or more adjusted parameters of the first DRX configuration that are based at least in part on the second DRX configuration.

28 Claims, 11 Drawing Sheets

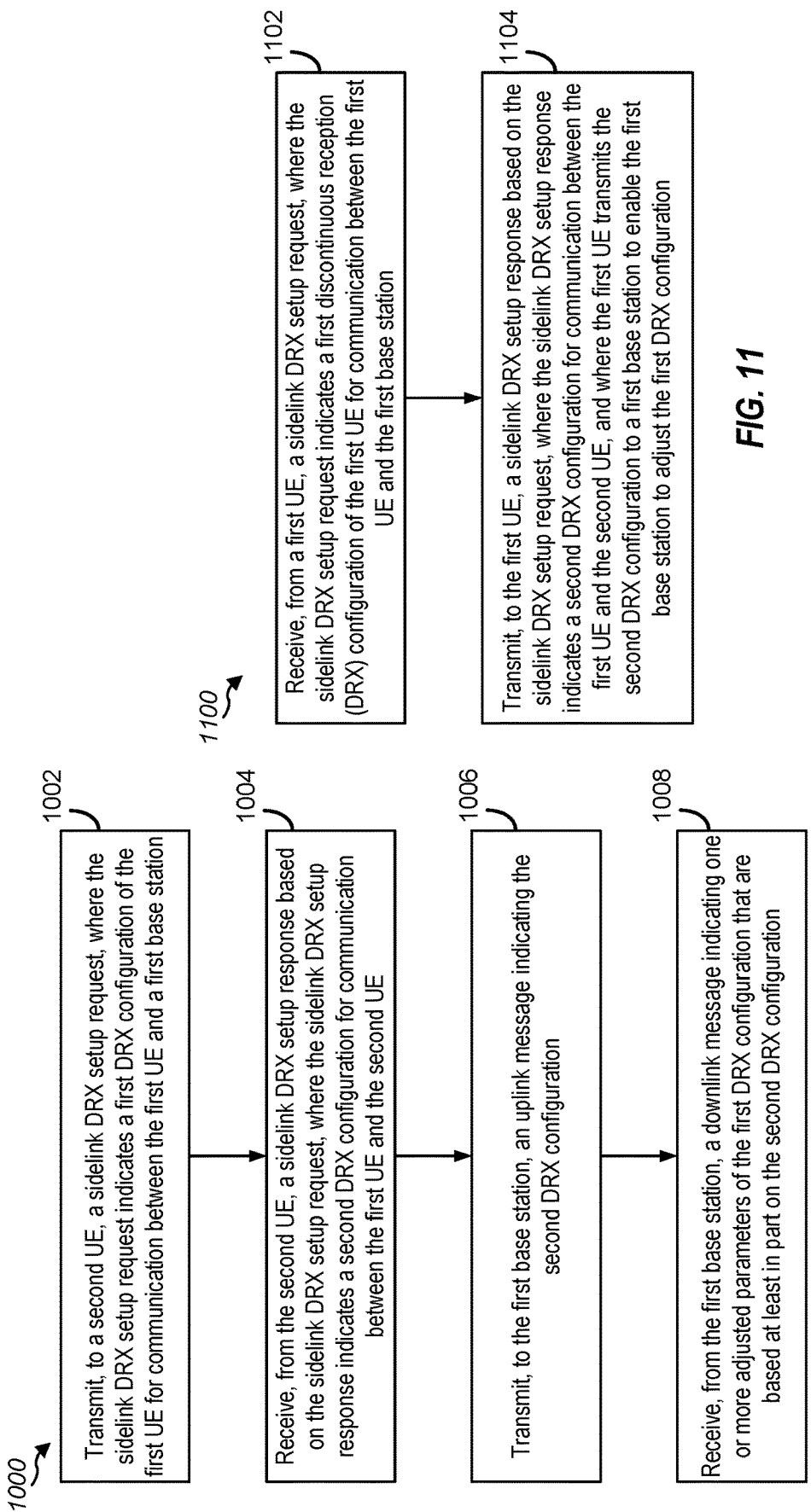

DISCONTINUOUS RECEPTION (DRX) CONFIGURATION FOR A USER EQUIPMENT (UE)

TECHNICAL FIELD

Aspects of the present disclosure relate generally to wireless communication systems, and more particularly, to wireless communication systems that use discontinuous reception (DRX) modes.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes one or more transmitters configured to transmit, from a first user equipment (UE) to a second UE, a sidelink discontinuous reception (DRX) setup request. The sidelink DRX setup request indicates a first DRX configuration of the first UE for communication between the first UE and a first base station. The apparatus further includes one or more receivers configured to receive, from the second UE, a sidelink DRX setup response based on the sidelink DRX setup request. The sidelink DRX setup response indicates a second DRX configuration for communication between the first UE and the second UE. The one or more transmitters are further configured to transmit, to the first base station, an uplink message indicating the second DRX configuration, and the one or more receivers are further configured to receive, from the first base station, a downlink message indicating one or more adjusted parameters of the first DRX configuration that are based at least in part on the second DRX configuration.

In some other aspects, an apparatus for wireless communication includes a receiver configured to receive, from a first UE by a second UE, a sidelink DRX setup request. The sidelink DRX setup request indicates a first DRX configuration of the first UE for communication between the first UE and a first base station. The apparatus further incudes a transmitter configured to transmit, to the first UE from the second UE, a sidelink DRX setup response based on the sidelink DRX setup request. The sidelink DRX setup response indicates a second DRX configuration for communication between the first UE and the second UE. The transmitter is further configured to transmit the second DRX configuration to a first base station to enable the first base station to adjust the first DRX configuration.

In some other aspects, a method of wireless communication performed by a first UE includes transmitting, to a second UE, a sidelink DRX setup request. The sidelink DRX setup request indicates a first DRX configuration of the first UE for communication between the first UE and a first base station. The method further includes receiving, from the second UE, a sidelink DRX setup response based on the sidelink DRX setup request. The sidelink DRX setup response indicates a second DRX configuration for communication between the first UE and the second UE. The method further includes transmitting, to the first base station, an uplink message indicating the second DRX configuration. The method further includes receiving, from the first base station, a downlink message indicating one or more adjusted parameters of the first DRX configuration that are based at least in part on the second DRX configuration.

In some other aspects, a method of wireless communication performed by a second UE includes receiving, from a first UE, a sidelink DRX setup request. The sidelink DRX setup request indicates a first DRX configuration of the first UE for communication between the first UE and a first base station. The method further includes transmitting, to the first UE, a sidelink DRX setup response based on the sidelink DRX setup request. The sidelink DRX setup response indicates a second DRX configuration for communication between the first UE and the second UE. The first UE transmits the second DRX configuration to a first base station to enable the first base station to adjust the first DRX configuration.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 10 is a flow diagram illustrating an example of a method of wireless communication of a UE according to some aspects.

FIG. 11 is a flow diagram illustrating another example of a method of wireless communication of a UE according to some aspects.

DETAILED DESCRIPTION

Figure 1:
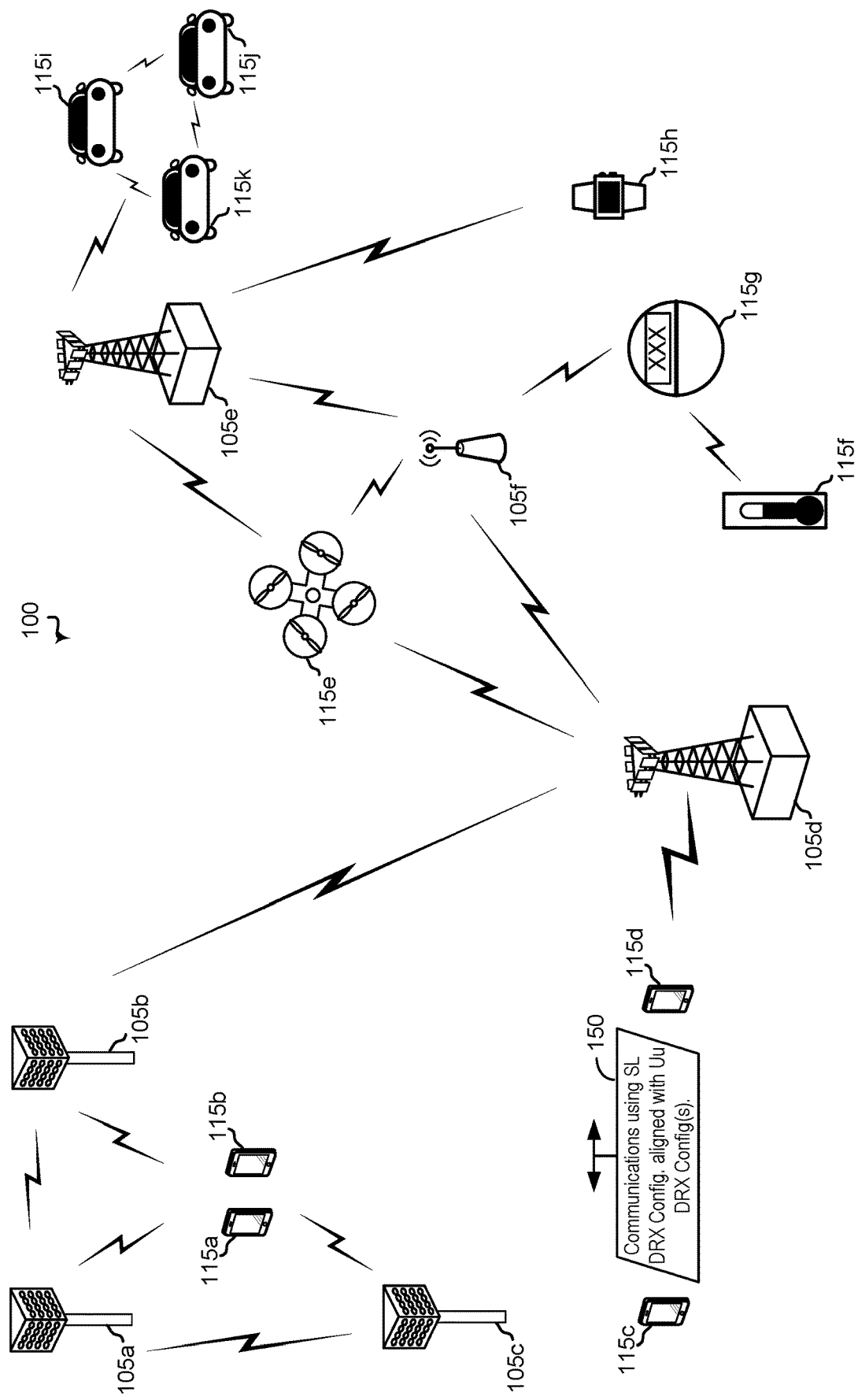
FIG. 1 is a block diagram illustrating details of an example wireless communication system according to one or more aspects.

Some wireless communications use a discontinuous reception (DRX) mode of operation to reduce power consumption of some devices. For example, a base station may configure a user equipment (UE) with a DRX configuration that indicates a parameters such as an inactivity timer. During a period of inactivity during which the UE does not communicate with the base station, the UE may adjust a value of the inactivity timer. In response to detecting expiration of the inactivity timer based on the adjusted value, the UE may initiate an inactive mode (e.g., a sleep mode) associated with the DRX configuration. The UE may wake from the inactive mode to operate based on an active mode (e.g., a wake mode), during which the UE may communicate with the base station. The DRX mode may also be referred to herein as a Uu DRX configuration.

In some cases, a UE may operate based on multiple DRX configurations. For example, a first UE may communicate with a base station based on a Uu DRX configuration and may communicate with a second UE based on a sidelink DRX configuration. In some cases, the Uu DRX configuration and the sidelink DRX configuration may be poorly aligned with one another. For example, a wireless communication protocol may specify that the base station is to determine the Uu DRX configuration and that the second UE (or a second base station associated with the second UE) is to determine the sidelink DRX configuration. In some cases, the Uu DRX configuration may specify an inactive mode that is to occur during an active mode specified by the DRX configuration (or vice versa). In such cases, if the first UE sleeps during the active mode, the UE may fail to receive messages that may be transmitted by the second UE. Alternatively, if the UE remains in the active mode, the UE may increase power consumption.

In some aspects of the disclosure, a first UE may be configured with a first Uu DRX configuration by a first base station. If the first UE transmits a request for a sidelink DRX configuration to a second UE, the first UE may include an indication of the first Uu DRX configuration with the request. In some examples, the second UE forwards the request to a second base station associated with the second UE. The base station may select the sidelink DRX configuration and a second Uu DRX configuration for the second UE that are aligned with one another. In some other examples, the second UE may determine the sidelink DRX configuration, such as if the second UE operates based on a radio resource control (RRC) idle or RRC inactive mode.

In some implementations, the first UE may forward an indication of the sidelink DRX configuration to the first base station to enable the first base station to align the first Uu DRX configuration with the sidelink DRX configuration (which may be aligned with the second Uu DRX configuration of the second UE). As a result, the first UE and the second UE may each communicate based on DRX configurations that are aligned with one another. By aligning the DRX configurations, one or both UEs may avoid waking during an inactive portion of one DRX configuration to communicate during an active portion of another DRX configuration. As a result, UE power consumption may be reduced.

As used herein, "aligning" a DRX configuration with another DRX configuration may refer to increasing an amount of overlap associated with active portions of the DRX configurations. The overlap may correspond to a number of slots or symbols in common between the active portions, as an illustrative examples. To illustrate, an active portion of a Uu DRX configuration and an active portion of a sidelink DRX configuration may include a first number of common slots or symbols. If one or both of the active portions are adjusted (e.g., delayed or advanced) so that the active portion of the Uu DRX configuration and the active portion of the sidelink DRX configuration include a second number of common slots or symbols that is greater than the first number, then the active portions may be referred to as aligned.

To further illustrate, aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some aspects, one or more UEs 115 may communicate with one or more other UEs using a sidelink (SL) discontinuous reception (DRX) configuration that is aligned with one or more UE-UMTS (Uu) DRX configurations. For example, the UEs 115c and 115d may perform communications 150 based on the SL DRX configuration that is aligned with one or more Uu DRX configurations. Alternatively or in addition, one or more other UEs may perform the communications 150.

Figure 2:
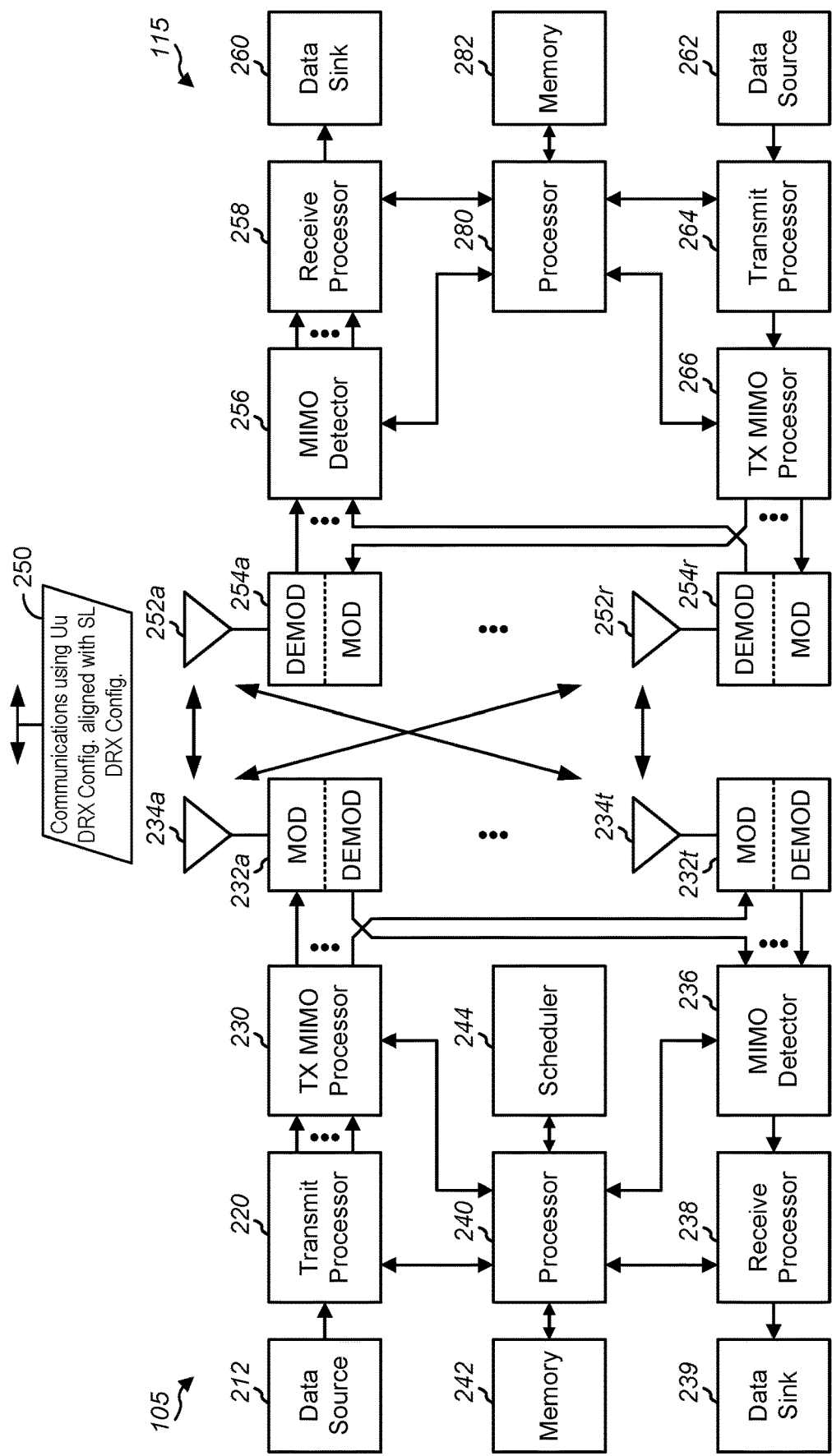
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the transmission or reception of communications 250 using a Uu DRX configuration that is aligned with a SL DRX configuration. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
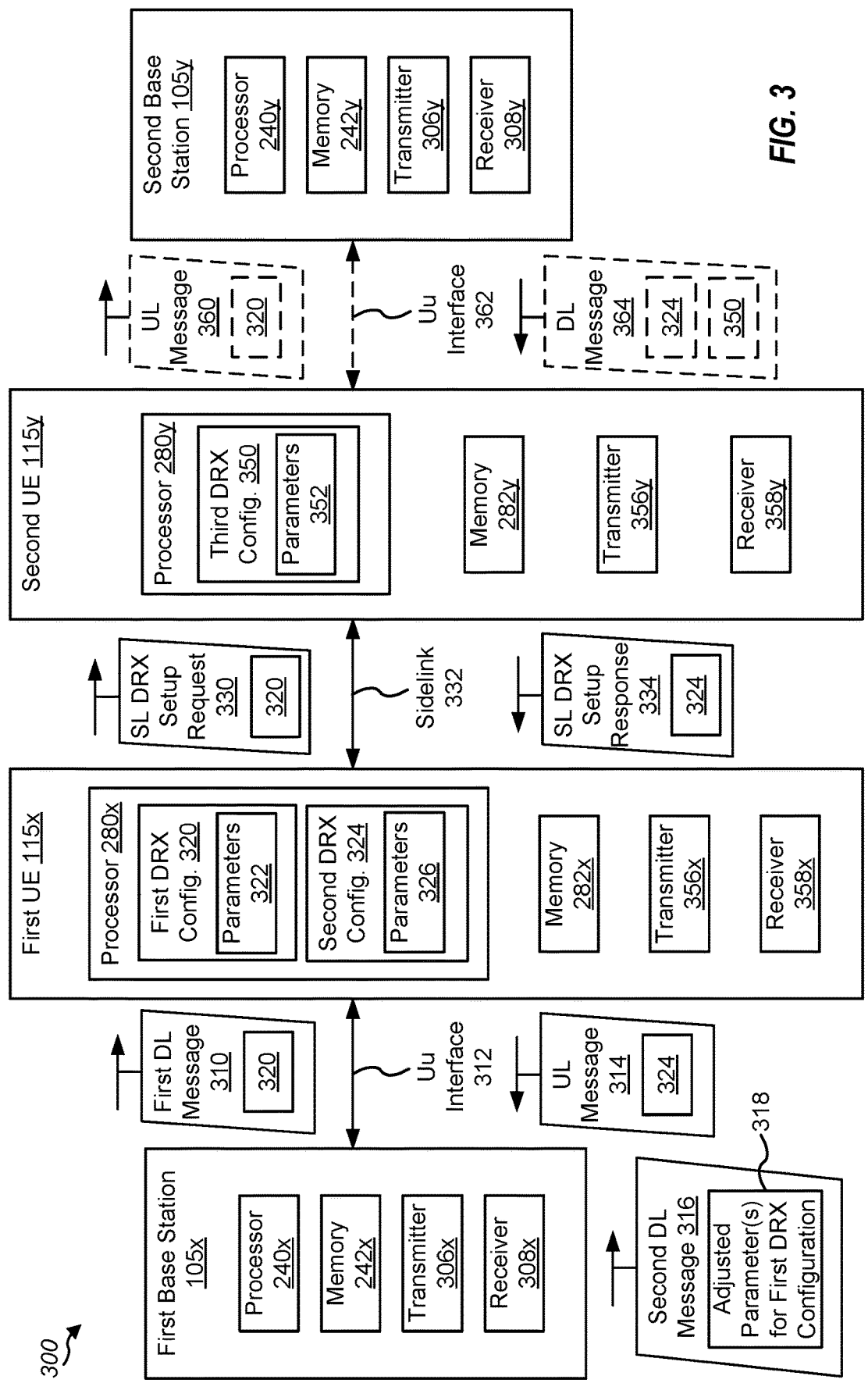
FIG. 3 is a block diagram illustrating an example of a wireless communication system according to one or more aspects.

FIG. 3 is a block diagram illustrating an example of a wireless communication system 300 according to some aspects of the disclosure. The wireless communication system 300 may include multiple base stations, such as a first base station 105x and a second base station 105y. The wireless communication system 300 may include multiple UEs, such as a first UE 115x and a second UE 115y. In some examples, the first UE 115x may be referred to as a receive (Rx) UE, and the second UE 115y may be referred to as a transmit (Tx) UE.

The base stations 105x-y may each include one or more processors (such as the processor 240) and may include one or more memories (such as the memory 242). For example, the first base station 105x may include a processor 240x and a memory 242x, and the second base station 105y may include a processor 240y and a memory 242y. The processor 240x may be coupled to the memory 242x, to the transmitter 306x, and to the receiver 308x, and the processor 240y may be coupled to the memory 242y, to the transmitter 306y, and to the receiver 308y. The first base station 105x may include a transmitter 306x and a receiver 308x, and the second base station 105y may include a transmitter 306y and a receiver 308y. In some examples, the transmitters 306x-y and the receivers 308x-y may include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 306x and the receiver 308x may be integrated in one or more transceivers of the first base station 105x, and the transmitter 306y and the receiver 308y may be integrated in one or more transceivers of the second base station 105y.

The transmitters 306x-y may be configured to transmit reference signals, synchronization signals, control information, and data to one or more other devices, and the receivers 308x-y may be configured to receive reference signals, control information, and data from one or more other devices. For example, the transmitter 306x may be configured to transmit signaling, control information, and data to the first UE 115x, and the receiver 308x may be configured to receive signaling, control information, and data from the first UE 115x. As another example, the transmitter 306y may be configured to transmit signaling, control information, and data to the second UE 115y, and the receiver 308y may be configured to receive signaling, control information, and data from the second UE 115y.

The UEs 115x-y may each include one or more processors (such as the processor 280), a memory (such as the memory 282), a transmitter, and a receiver. For example, the first UE 115x may include a processor 280x, a memory 282x, one or more transmitters (hereinafter referred to as a transmitter 356x), and one or more receivers (hereinafter referred to as a receiver 358x). As another example, the second UE 115y may include a processor 280y, a memory 282y, one or more transmitters (hereinafter referred to as a transmitter 356y), and one or more receivers (herein after referred to as a receiver 358y). In some examples, the transmitters 356x and 356y and the receivers 358x and 358y may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356x and the receiver 358x may be integrated in one or more transceivers of the first UE 115x, and the transmitter 356y and the receiver 358y may be integrated in one or more transceivers of the second UE 115y.

The transmitters 356x and 356y may transmit reference signals, synchronization signals, control information, and data to one or more other devices, and the receivers 358x and 358y may receive reference signals, control information, and data from one or more other devices. For example, in some implementations, the transmitter 356x may transmit signaling, control information, and data to one or more of the first base station 105x or the second UE 115y, and the receiver 358x may receive signaling, control information, and data from one or more of the first base station 105x or the second UE 115y. As another example, in some implementations, the transmitter 356y may transmit signaling, control information, and data to one or more of the second base station 105y or the first UE 115x, and the receiver 358y may receive signaling, control information, and data from one or more of the second base station 105y or the first UE 115x.

In some implementations, one or more of the transmitter 306x, the transmitter 306y, the receiver 308x, the receiver 308y, the transmitter 356x, the transmitter 356y, the receiver 358x, or the receiver 358y may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Depending on the particular example, aspects described herein may be used in connection with a mode one ("Mode 1") sidelink resource allocation mode, a mode two ("Mode 2") sidelink resource allocation mode, one or more other modes, or a combination thereof. A mode one sidelink resource allocation operation may correspond to a centralized mode in which the base station 105 determines a resource allocation for a wireless communication by one or more of the UEs 115x, 115y. A mode two sidelink resource allocation operation may correspond to a distributed mode in which one or more of the UEs 115x, 115y are enabled to autonomously determine a resource allocation for a wireless communication (e.g., instead of receiving an indication of the resource allocation from the base station 105).

The wireless communication system 300 may use wireless communication channels, which may be specified by one or more wireless communication protocols, such as a 5G NR wireless communication protocol. To illustrate, the base stations 105x-y may communicate with the UEs 115x-y using one or more downlink wireless communication channels (e.g., using one or more of a PDSCH or a PDCCH) and using one or more uplink wireless communication channels (e.g., using one or more of a PUSCH or a PUCCH). The UEs 115x-y may communicate with one another using one or more sidelink channels, such as one or more of a sidelink control channel (e.g., a PSCCH), a sidelink data channel (e.g., a PSSCH), or a sidelink feedback channel (e.g., a PSFCH).

To further illustrate, the first base station 105x may communicate with the first UE 115x using a UE-UMTS (Uu) interface 312, which may include a PDSCH, a PDCCH, a PUSCH, and a PUCCH, as illustrative examples. The second base station 105y may communicate with the second UE 115y using a Uu interface 362, which may include a PDSCH, a PDCCH, a PUSCH, and a PUCCH, as illustrative examples. A Uu interface may also be referred to as an access link. The first UE 115x may communicate with the second UE 115y using a sidelink 332, which may include a PSCCH, a PSSCH, and a PSFCH, as illustrative examples.

During operation, the first base station 105x may configure the first UE 115x with a first DRX configuration 320. For example, the first base station 105x may transmit a first downlink message 310 to the first UE 115x indicating the first DRX configuration 320. The first DRX configuration 320 may specify parameters 322 for communication between the first UE 115x and the first base station 105x. For example, the first DRX configuration 320 may specify a DRX cycle that includes an active portion and an inactive portion. During the active portion, the first UE 115x may operate based on a "wake" mode and may perform or monitor for communications associated with the first base station 105x. During the inactive portion, the first UE 115x may operate based on a "sleep" mode (e.g., where one or more of the transmitter 356x or the receiver 358x operate based on a low-power mode). To further illustrate, in some implementations, the parameters 322 may include one or more of a long cycle start offset, a short DRX cycle, a short cycle timer, or a DRX slot offset, as illustrative examples.

In some circumstances, the first UE 115x may communicate with one or more other UEs, such as the second UE 115y, via the sidelink 332. In some aspects of the disclosure, the first UE 115x may transmit a sidelink DRX setup request 330 to the second UE 115y via the sidelink 332. The sidelink DRX setup request 330 may indicate the first DRX configuration 320 and may indicate a request for the second UE 115y to determine, or obtain, a second DRX configuration 324 for the first UE 115x. The second UE 115y may receive the sidelink DRX setup request 330 from the first UE 115x via the sidelink 332.

In some illustrative implementations, the second base station 105y may determine the second DRX configuration 324. To illustrate, the first UE 115x may transmit the sidelink DRX setup request 330 during a radio resource control (RRC) connected mode of operation of the first UE 115x and the second UE 115y. The RRC connected mode may be associated with the Uu interface 312 and the Uu interface 362. The second UE 115y may use the Uu interface 362 to transmit an uplink message 360 to the second base station 105y. The uplink message 360 may indicate the first DRX configuration 320 and may indicate a request for the second base station 105y to determine the second DRX configuration 324.

In some examples, based on the uplink message 360, the second base station 105y determines the second DRX configuration 324 and a third DRX configuration 350 for communication between the second UE 115y and the second base station 105y. For example, the second base station 105y may select the second DRX configuration 324 and the third DRX configuration 350 such that the active portion of the second DRX configuration 324 is aligned with an active portion of the third DRX configuration 350. In some such examples, the second DRX configuration 324 may be based at least in part on the third DRX configuration 350 (or vice versa). The second base station 105y may transmit to the second UE 115y a downlink message 364 indicating the second DRX configuration 324 and the third DRX configuration 350.

The third DRX configuration 350 may specify parameters 352 for communication between the second UE 115y and the second base station 105y. For example, the third DRX configuration 350 may specify a DRX cycle that includes an active portion and an inactive portion. During the active portion, the second UE 115y may operate based on a "wake" mode and may perform or monitor for communications associated with the second base station 105y. During the inactive portion, the second UE 115y may operate based on a "sleep" mode (e.g., where one or more of the transmitter 356y or the receiver 358y operate based on a low-power mode). To further illustrate, in some implementations, the parameters 352 may include one or more of a long cycle start offset, a short DRX cycle, a short cycle timer, or a DRX slot offset, as illustrative examples.

In some other illustrative implementations, the first UE 115x may transmit the sidelink DRX setup request 330 during an RRC connected mode of operation of the first UE 115x and during an RRC inactive mode or RRC idle mode of operation of the second UE 115y. During the RRC inactive mode or RRC idle mode, the second UE 115y may not be configured with the third DRX configuration 350 and the Uu interface 362. In some such examples, the second UE 115y may determine the second DRX configuration 324 (e.g., because the second UE 115y may be unable to communicate with the second base station 105y). In some examples, the second UE 115y may select the second DRX configuration 324 randomly, pseudo-randomly, based on a "default" DRX configuration previously specified by the second base station 105y, based on a "default" DRX configuration specified by a wireless communication protocol, or based on another technique.

After determining or obtaining the second DRX configuration 324, the second UE 115y may transmit a sidelink DRX setup response 334 to the first UE 115x indicating the second DRX configuration 324. After receiving the sidelink DRX setup response 334 from the second UE 115y, the first UE 115x may communicate with the second UE 115y based on the second DRX configuration 324. To illustrate, the second DRX configuration 324 may specify parameters 326 for communication between the first UE 115x and the second UE 115y. For example, the second DRX configuration 324 may specify a DRX cycle that includes an active portion and an inactive portion. During the active portion, the first UE 115x may operate based on a "wake" mode and may perform or monitor for communications associated with the second UE 115y. During the inactive portion, the first UE 115x may operate based on a "sleep" mode (e.g., where one or more of the transmitter 356x or the receiver 358x operate based on a low-power mode). To further illustrate, in some implementations, the parameters 326 may include one or more of a sidelink DRX start offset, a sidelink DRX cycle, or a sidelink DRX slot offset, as illustrative examples.

In some aspects, the first UE 115x may indicate the second DRX configuration 324 to the first base station 105x. For example, the first UE 115x may transmit, to the first base station 105x, an uplink message 314 indicating the second DRX configuration 324. Based on the second DRX configuration 324, the first base station 105x may adjust one or more of the parameters 322 of the first DRX configuration 320 to determine one or more adjusted parameters 318 associated with the first DRX configuration 320. For example, the first base station 105x may adjust the active portion of the first DRX configuration 320 to be aligned with the active portion of the second DRX configuration 324. In some such examples, the one or more adjusted parameters 318 may include one or more of a start time, end time, or duration of the active portion of the first DRX configuration 320. The second base station 105y may transmit to the second UE 115y a second downlink message 316 indicating the one or more adjusted parameters 318. The first UE 115x may operate based on the one or more adjusted parameters 318, such as by communicating with the second UE 115y using the first DRX configuration 320 based on the one or more adjusted parameters 318.

To further illustrate, in some aspects, one or more of the parameters 322 may be adjusted (e.g., to determine the one or more adjusted parameters 318) to align the first DRX configuration 320 with one or more of the second DRX configuration 324 or the third DRX configuration 350. For example, the parameters 322 may include one or more of a long cycle start offset, a short DRX cycle, a short cycle timer, or a DRX slot offset. One or more of the long cycle start offset, the short DRX cycle, the short cycle timer, or the DRX slot offset may be adjusted to align the first DRX configuration 320 with one or more of the second DRX configuration 324 or the third DRX configuration 350.

Alternatively or in addition, one or more of the parameters 326 may be adjusted to align the second DRX configuration 324 with one or more of the first DRX configuration 320 or the third DRX configuration 350. For example, the parameters 326 may include one or more of a sidelink DRX start offset, a sidelink DRX cycle, or a sidelink DRX slot offset.

One or more of the sidelink DRX start offset, the sidelink DRX cycle, or the sidelink DRX slot offset may be adjusted to align the second DRX configuration 324 with one or more of the first DRX configuration 320 or the third DRX configuration 350.

Alternatively or in addition, one or more of the parameters 352 may be adjusted to align the third DRX configuration 350 with one or more of the first DRX configuration 320 or the second DRX configuration 324. For example, the parameters 352 may include one or more of a long cycle start offset, a short DRX cycle, a short cycle timer, or a DRX slot offset. One or more of the long cycle start offset, the short DRX cycle, the short cycle timer, or the DRX slot offset may be adjusted to align the third DRX configuration 350 with one or more of the first DRX configuration 320 or the second DRX configuration 324.

The devices illustrated in FIG. 3 may communicate based on the DRX configurations 320, 324, and 350. For example, the first base station 105x and the first UE 115x may perform the communications 250 of FIG. 2 based on the first DRX configuration 320. As another example, the first UE 115x and the second UE 115y may perform the communications 150 of FIG. 1 based on the second DRX configuration 324. As an additional example, the second UE 115y and the second base station 105y may perform the communications 250 of FIG. 2 based on the third DRX configuration 350.

Figure 4:
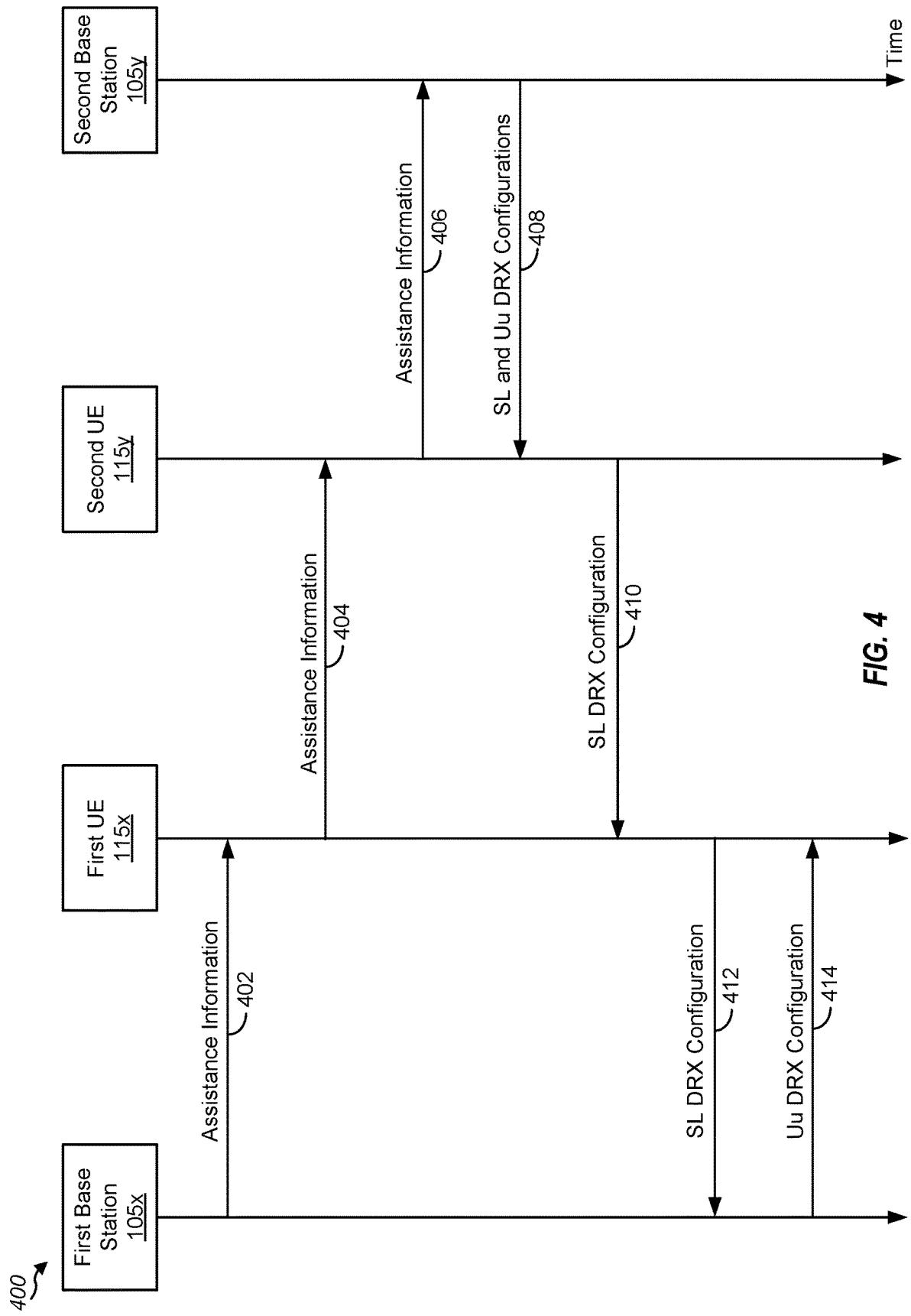
FIG. 4 is a ladder diagram illustrating examples of operations that may be performed according to some aspects.

FIG. 4 is a ladder diagram illustrating examples of operations 400 that may be performed according to some aspects of the disclosure. In some implementations, the operations 400 are performed during operation of the first UE 115x and the second UE 115y based on an RRC connected mode.

The operations 400 may include transmitting assistance information by the first base station 105x to the first UE 115x, at 402. The assistance information may indicate the first DRX configuration 320. In some examples, the assistance information may be included in the first downlink message 310.

The operations 400 may further include transmitting the assistance information by the first UE 115x to the second UE 115y, at 404, and transmitting the assistance information by the second UE 115y to the second base station 105y, at 406. The assistance information may indicate the first DRX configuration 320.

The operations 400 may further include transmitting, by the second base station 105y to the second UE 115y, a sidelink DRX configuration associated with the first UE 115x and a Uu DRX configuration associated with the second UE 115y, at 408. To illustrate, the sidelink DRX configuration may correspond to the second DRX configuration 324, and the Uu DRX configuration may correspond to the third DRX configuration 350.

The operations 400 may further include forwarding the sidelink DRX configuration by the second UE 115y to the first UE 115x, at 410, and forwarding the sidelink DRX configuration by the first UE 115x to the first base station 105x, at 412. The first base station 105x may transmit an update to a Uu DRX configuration associated with the first UE 115x, at 414. For example, the first base station 105x may transmit the second downlink message 316 indicating the one or more adjusted parameters associated with the first DRX configuration 320.

Figure 5:
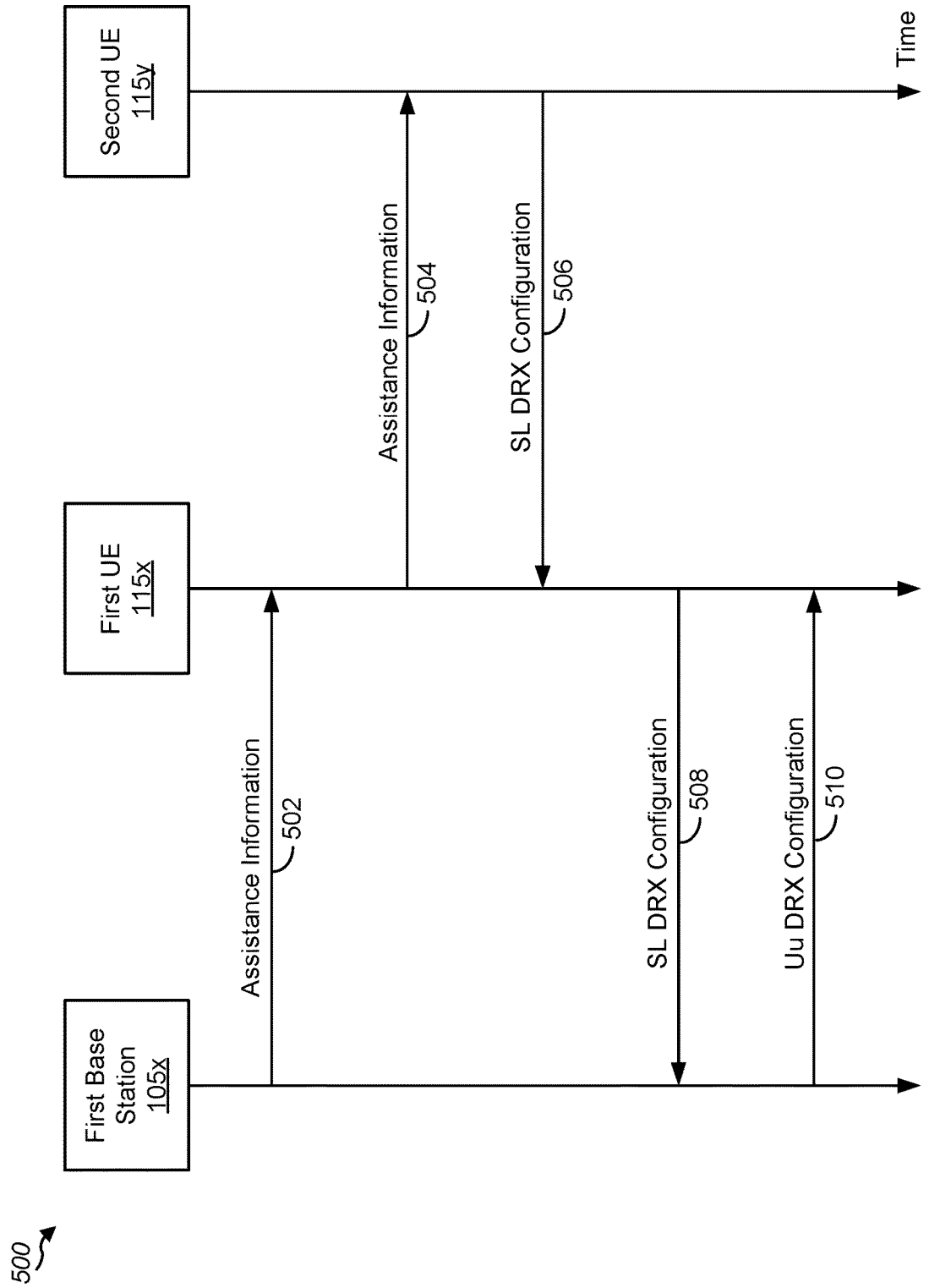
FIG. 5 is a ladder diagram illustrating examples of operations that may be performed according to some aspects.

FIG. 5 is a ladder diagram illustrating examples of operations 500 that may be performed according to some aspects of the disclosure. In some implementations, the operations 500 are performed during operation of the first UE 115x and during operation of the second UE 115y based on an RRC inactive or RRC idle mode.

The operations 500 may include transmitting assistance information by the first base station 105x to the first UE 115x, at 502. The assistance information may indicate the first DRX configuration 320. In some examples, the assistance information may be included in the first downlink message 310.

The operations 500 may further include transmitting the assistance information by the first UE 115x to the second UE 115y, at 504. The assistance information may indicate the first DRX configuration 320.

The operations 500 may further include transmitting, by the second UE 115y to the first UE 115x, a sidelink DRX configuration associated with the first UE 115x, at 506. To illustrate, the sidelink DRX configuration may correspond to the second DRX configuration 324.

The operations 500 may further include forwarding the sidelink DRX configuration by the first UE 115x to the first base station 105x, at 508. The first base station 105x may transmit an update to a Uu DRX configuration associated with the first UE 115x, at 510. For example, the first base station 105x may transmit the second downlink message 316 indicating the one or more adjusted parameters associated with the first DRX configuration 320.

Figure 6:
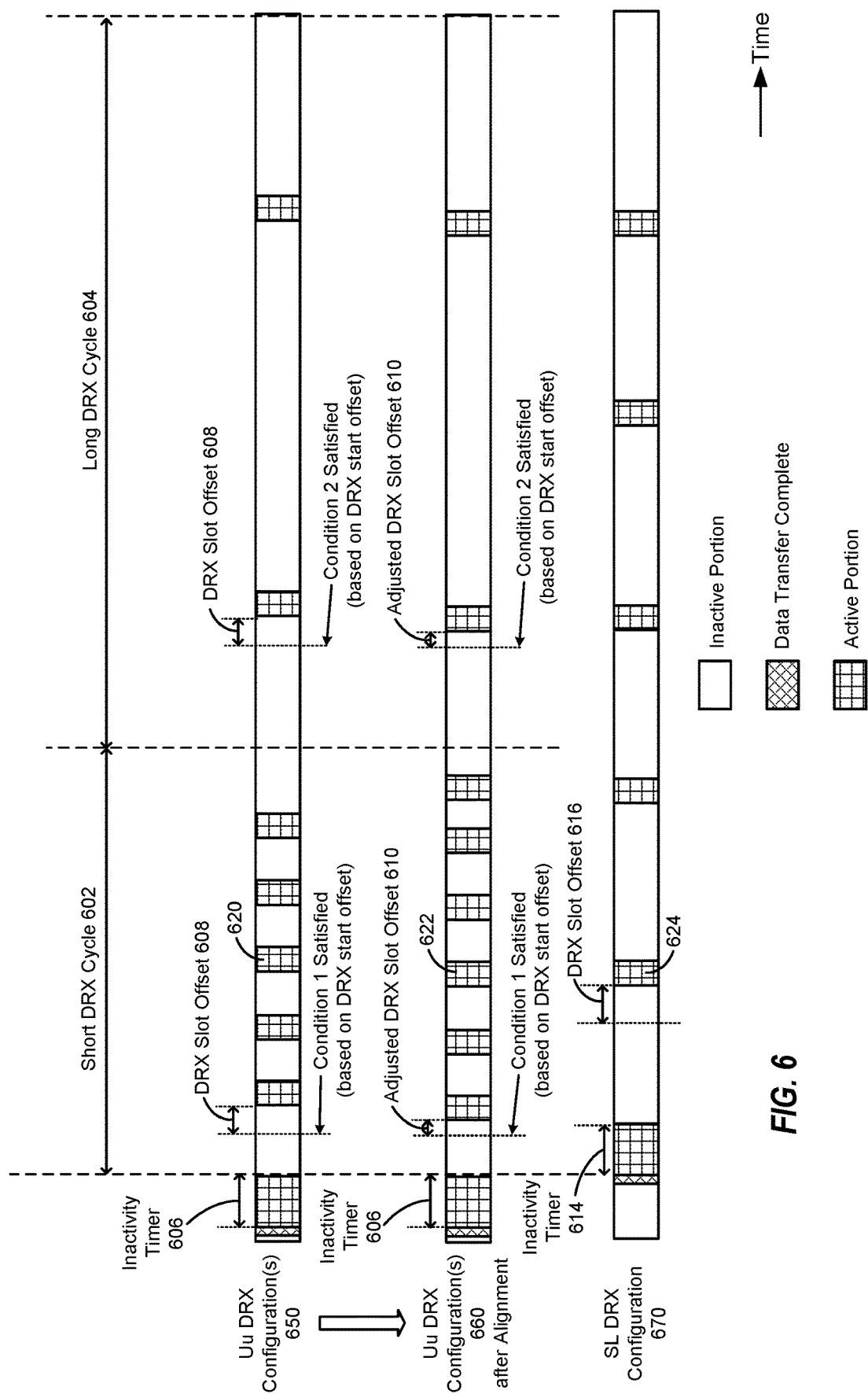
FIG. 6 is a timing diagram illustrating an example of aligning a DRX slot offset of one or more Uu DRX configurations with a sidelink DRX configuration to determine an adjusted DRX slot offset according to some aspects.

FIG. 6 is a timing diagram illustrating an example of aligning a DRX slot offset 608 of one or more Uu DRX configurations 650 with a sidelink DRX configuration 670 to determine an adjusted DRX slot offset 610 according to some aspects. In some examples, the one or more Uu DRX configurations 650 may include or correspond to one or both of the first DRX configuration 320 or the third DRX configuration 350, and the sidelink DRX configuration 670 may correspond to the second DRX configuration 324. In some examples, the adjusted DRX slot offset 610 is included in one or both of the parameters 352 or the one or more adjusted parameters 318.

FIG. 6 illustrates examples in which each DRX configuration 650, 660, and 670 is associated with inactive portions (e.g., sleep modes of operation), data transfer portions, and active portions (e.g., wake modes of operation). The Uu DRX configurations 650, 660 may be associated with one or both of a short DRX cycle 602 (e.g., following expiration of an inactivity timer 606) or a long DRX cycle 604. An inactive portion associated with the Uu DRX configurations 650 may follow expiration of the inactivity timer 606, and an inactive portion of the sidelink DRX configuration 670 may follow expiration of an inactivity timer 614. The sidelink DRX configuration 670 may be associated with a DRX slot offset 616.

In the short DRX cycle 602, after detection that a first condition ("condition 1") associated with the short DRX cycle 602 is satisfied, an active portion may be initiated after the DRX slot offset 608. In the long DRX cycle 604, after detection that a second condition ("condition 2") associated with the long DRX cycle 604 is satisfied, an active portion may be initiated after the DRX slot offset 608. In some implementations, the first condition and the second condition may be based on (e.g., may be a function of) a DRX start offset.

FIG. 6 also illustrates that, in some circumstances, active portions of the Uu DRX configurations 650 may be unaligned with active portions of the sidelink DRX configuration 670. For example, at least some of an active portion 620 of the Uu DRX configurations 650 may occur after an active portion 624 of the sidelink DRX configuration 670. The DRX slot offset 608 may be adjusted (e.g., reduced) so that the active portion 620 is moved, creating an active portion 622. In some examples, the active portion 620 includes a first amount of overlap with the active portion 624 (e.g., a first number of slots or symbols in common with the active portion 624), and the active portion 622 includes a second amount of overlap with the active portion 624 that is greater than the first amount of overlap (e.g., a second number of slots or symbols in common with the active portion 624 that is greater than the first number). As a result, the active portion 622 within the Uu DRX configurations may be aligned with the active portion 624 of the sidelink DRX configuration 670.

Figure 7:
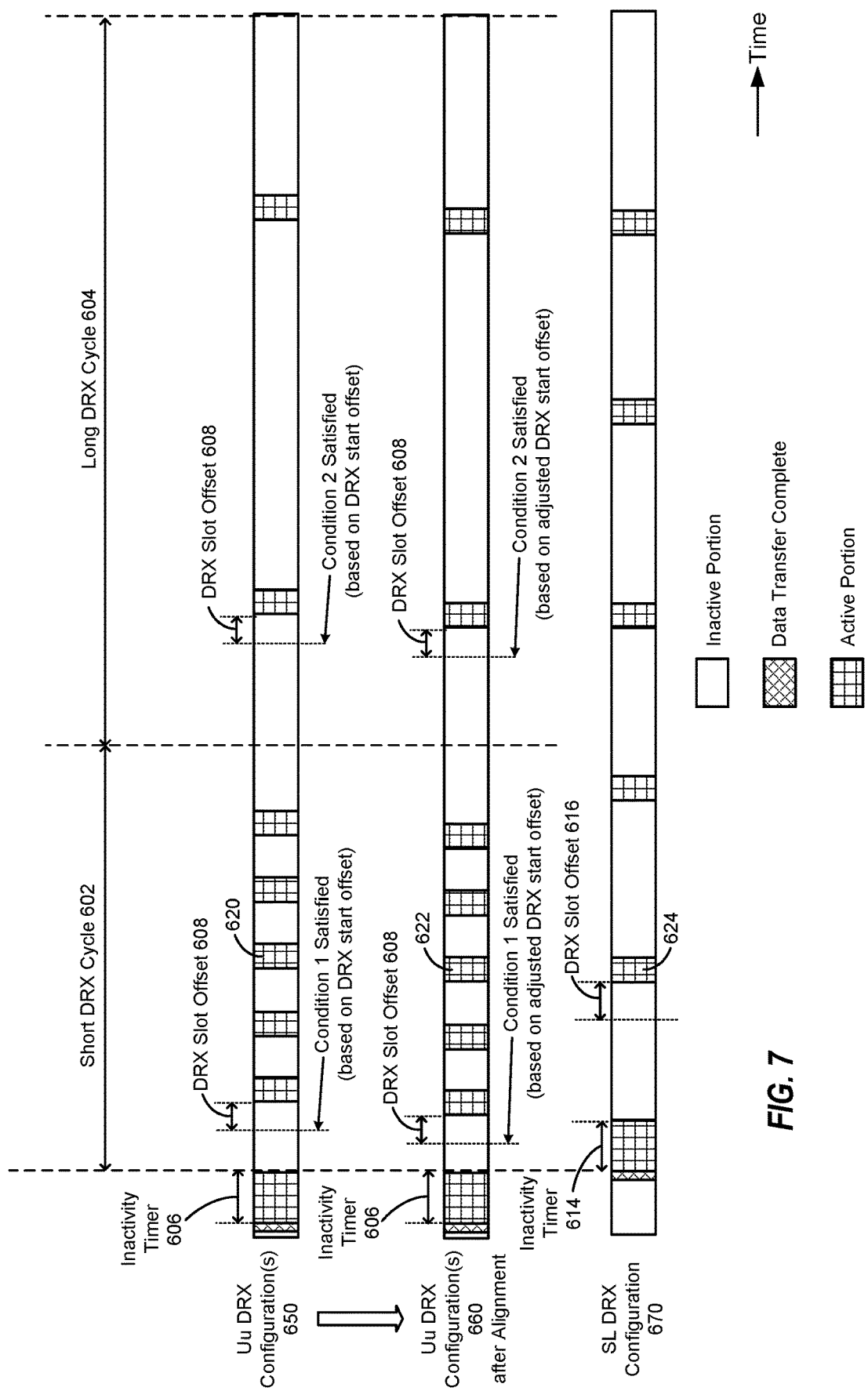
FIG. 7 is a timing diagram illustrating an example of aligning a first DRX start offset of one or more Uu DRX configurations with a sidelink DRX configuration to determine an adjusted DRX start offset according to some aspects.

FIG. 7 is a timing diagram illustrating an example of aligning a first DRX start offset of the one or more Uu DRX configurations 650 with the sidelink DRX configuration 670 to determine an adjusted DRX start offset according to some aspects. In some examples, the one or more Uu DRX configurations 650 may include or correspond to one or both of the first DRX configuration 320 or the third DRX configuration 350, and the sidelink DRX configuration 670 may correspond to the second DRX configuration 324. In some examples, the adjusted DRX start offset is included in one or both of the parameters 352 or the one or more adjusted parameters 318.

FIG. 7 illustrates that the first condition and the second condition may be changed (e.g., "relaxed") so that active portions of the Uu DRX configurations 660 align with active portions of the sidelink DRX configuration 670. For example, the DRX start offset may be selected or adjusted so that active portions of the Uu DRX configurations 660 (such as the active portion 622) align with active portions of the sidelink DRX configuration 670 (such as the active portion 624). Depending on the implementation, the DRX start offset of FIG. 7 may be adjusted alternatively or in addition to the DRX slot offset 608 of FIG. 6, one or more other parameters, or a combination thereof.

Although certain examples have been described with reference to adjusting one or more parameters of a DRX configuration associated with a Uu interface, other examples are also within the scope of the disclosure. For example, alternatively or in addition to adjusting one or more parameters of a DRX configuration associated with a Uu interface, one or more parameters of a sidelink DRX configuration may be adjusted, such as described with reference to the examples of FIGS. 8 and 9.

Figure 8:
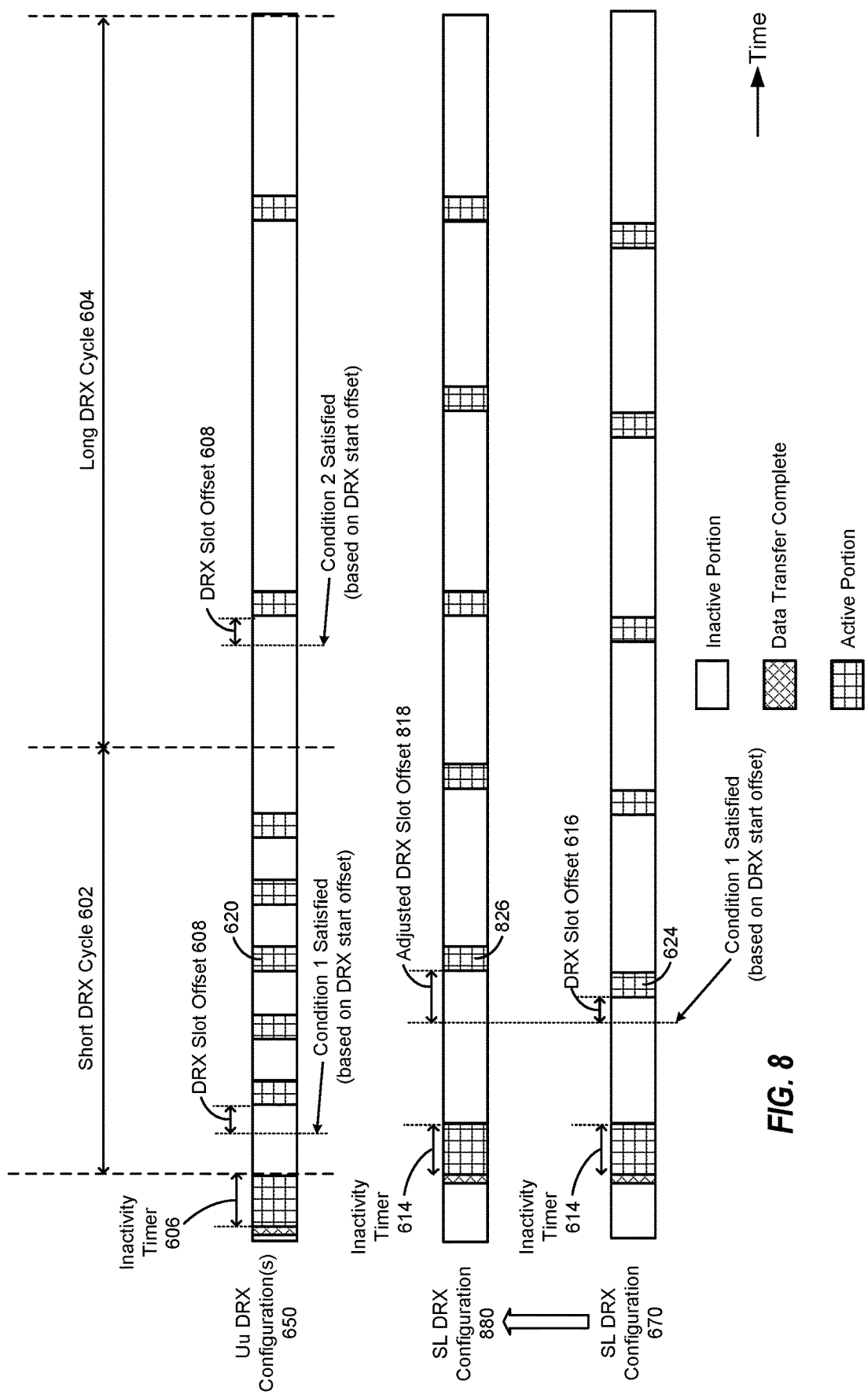
FIG. 8 is a timing diagram illustrating an example of aligning a DRX slot offset of a sidelink DRX configuration with one or more Uu DRX configurations to determine an adjusted DRX slot offset according to some aspects.

FIG. 8 is a timing diagram illustrating an example of aligning the DRX slot offset 616 of the sidelink DRX configuration 670 with the one or more Uu DRX configurations 650 to determine an adjusted DRX slot offset 818 according to some aspects. In some examples, the adjusted DRX slot offset 818 is included in the parameters 322 of the first DRX configuration 320.

FIG. 8 illustrates that the DRX slot offset 616 may be changed (e.g., increased) so that active portions of the Uu DRX configurations 650 align with active portions of a sidelink DRX configuration 880. For example, the DRX slot offset 616 may be adjusted or selected so that active portions of the Uu DRX configurations 650 (such as the active portion 620) align with active portions of the sidelink DRX configuration 880 (such as an active portion 826). Depending on the implementation, the DRX slot offset 616 may be adjusted alternatively or in addition to the DRX slot offset 608 of FIG. 6, the DRX start offset of FIG. 7, one or more other parameters, or a combination thereof.

Figure 9:
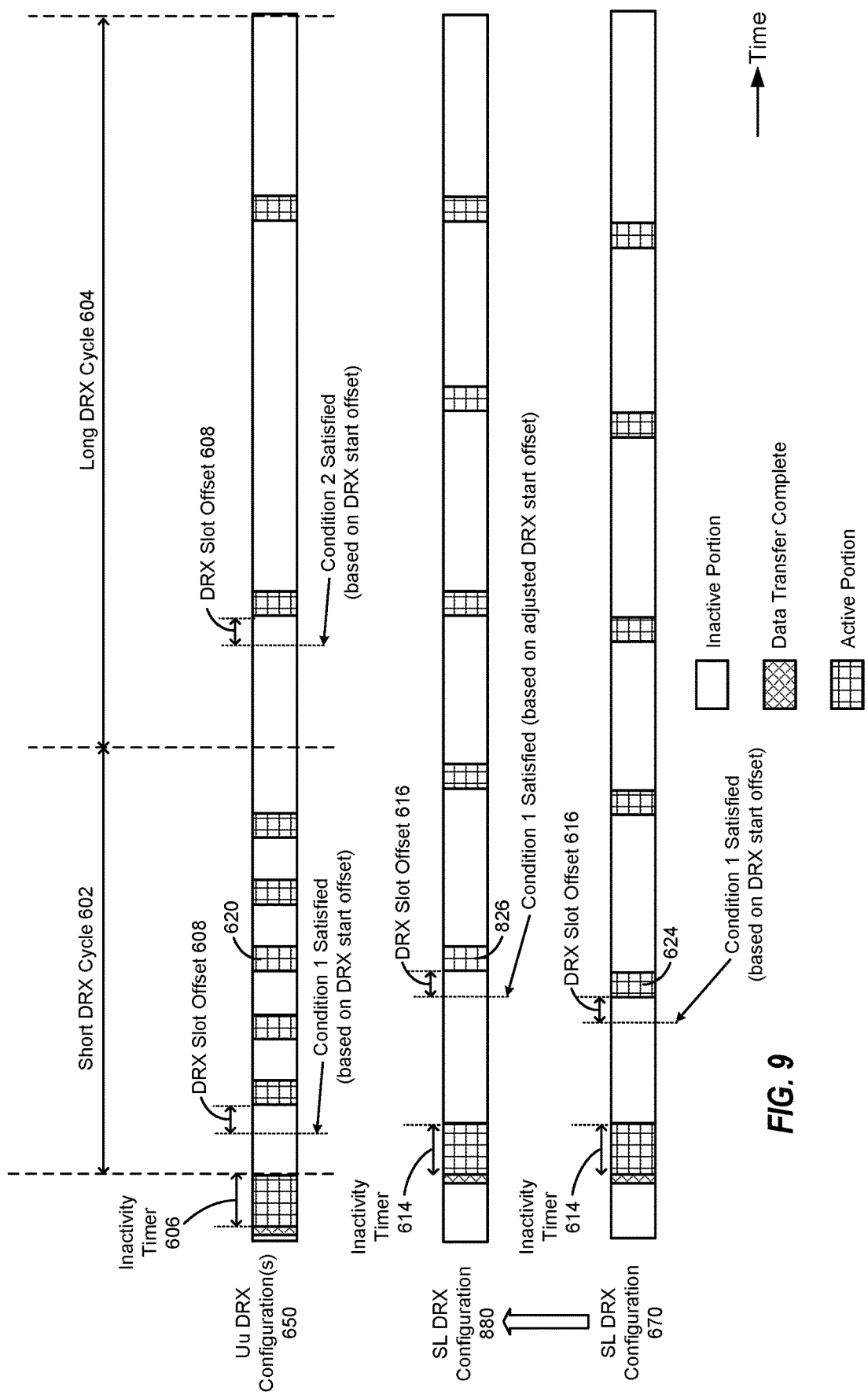
FIG. 9 is a timing diagram illustrating an example of aligning a first DRX start offset of a sidelink DRX configuration with one or more Uu DRX configurations to determine an adjusted DRX start offset according to some aspects.

FIG. 9 is a timing diagram illustrating an example of aligning a first DRX start offset of the sidelink DRX configuration 670 with the one or more Uu DRX configurations 650 to determine an adjusted DRX start offset according to some aspects. In some examples, the adjusted DRX start offset is included in the parameters 322 of the first DRX configuration 320.

FIG. 9 illustrates that the DRX start offset may be adjusted or selected so that active portions of the Uu DRX configurations 650 align with active portions of the sidelink DRX configuration 880. For example, the DRX start offset may be adjusted or selected so that active portions of the Uu DRX configurations 650 (such as the active portion 620) align with active portions of the sidelink DRX configuration 880 (such as an active portion 826). Depending on the implementation, the DRX start offset may be adjusted alternatively or in addition to the DRX slot offset 608 of FIG. 6, the DRX start offset of FIG. 7, the DRX slot offset 616 of FIG. 6, one or more other parameters, or a combination thereof.

One or more aspects described herein may improve performance of one or more devices in a wireless communication system. For example, by aligning the DRX configurations 320, 324, and 350, one or both UEs 115x-y may avoid waking during an inactive portion of one DRX configuration to communicate during an active portion of another DRX configuration. As a result, UE power consumption may be reduced.

FIG. 10 is a flow chart of an example of a method 1000 of wireless communication performed by a first UE according to some aspects of the disclosure. In some examples, the first UE corresponds to the first UE 115x.

The method 1000 includes transmitting, to a second UE, a sidelink DRX setup request, at 1002. The sidelink DRX setup request indicates a first DRX configuration of the first UE for communication between the first UE and a first base station. For example, the first UE 115x may transmit the sidelink DRX setup request 330 to the second UE 115y indicating the first DRX configuration 320 for communication between the first UE 115x and the first base station 105x.

The method 1000 further includes receiving, from the second UE, a sidelink DRX setup response based on the sidelink DRX setup request, at 1004. The sidelink DRX setup response indicates a second DRX configuration for communication between the first UE and the second UE. For example, the first UE 115x may receive the sidelink DRX setup response 334 based on the sidelink DRX setup request 330, and the sidelink DRX setup response 334 may indicate the second DRX configuration 324 for communication between the first UE 115x and the second UE 115y (e.g., via the sidelink 332).

The method 1000 further includes transmitting, to the first base station, an uplink message indicating the second DRX configuration, at 1006. For example, the first base station 105x may transmit, to the first base station 105x, the uplink message 314 indicating the second DRX configuration 324.

The method 1000 further includes receiving, from the first base station, a downlink message indicating one or more adjusted parameters of the first DRX configuration that are based at least in part on the second DRX configuration, at 1008. For example, the first UE 115x may receive the second downlink message 316 indicating the one or more adjusted parameters 318.

FIG. 11 is a flow chart of an example of a method 1100 of wireless communication performed by a second UE according to some aspects of the disclosure. In some examples, the second UE corresponds to the second UE 115y.

The method 1100 includes receiving, from a first UE, a sidelink DRX setup request, at 1102. The sidelink DRX setup request indicates a first DRX configuration of the first UE for communication between the first UE and a first base station. For example, the second UE 115y may receive the sidelink DRX setup request 330 from the first UE 115x indicating the first DRX configuration 320 for communication between the first UE 115x and the first base station 105x.

The method 1100 further includes includes transmitting, to the first UE, a sidelink DRX setup response based on the sidelink DRX setup request, at 1104. The sidelink DRX setup response indicates a second DRX configuration for communication between the first UE and the second UE. The first UE transmits the second DRX configuration to a first base station to enable the first base station to adjust the first DRX configuration. For example, the second UE 115y may transmit the sidelink DRX setup response 334 based on the sidelink DRX setup request 330, and the sidelink DRX setup response 334 may indicate the second DRX configuration 324 for communication between the first UE 115x and the second UE 115y (e.g., via the sidelink 332).

Figure 12:
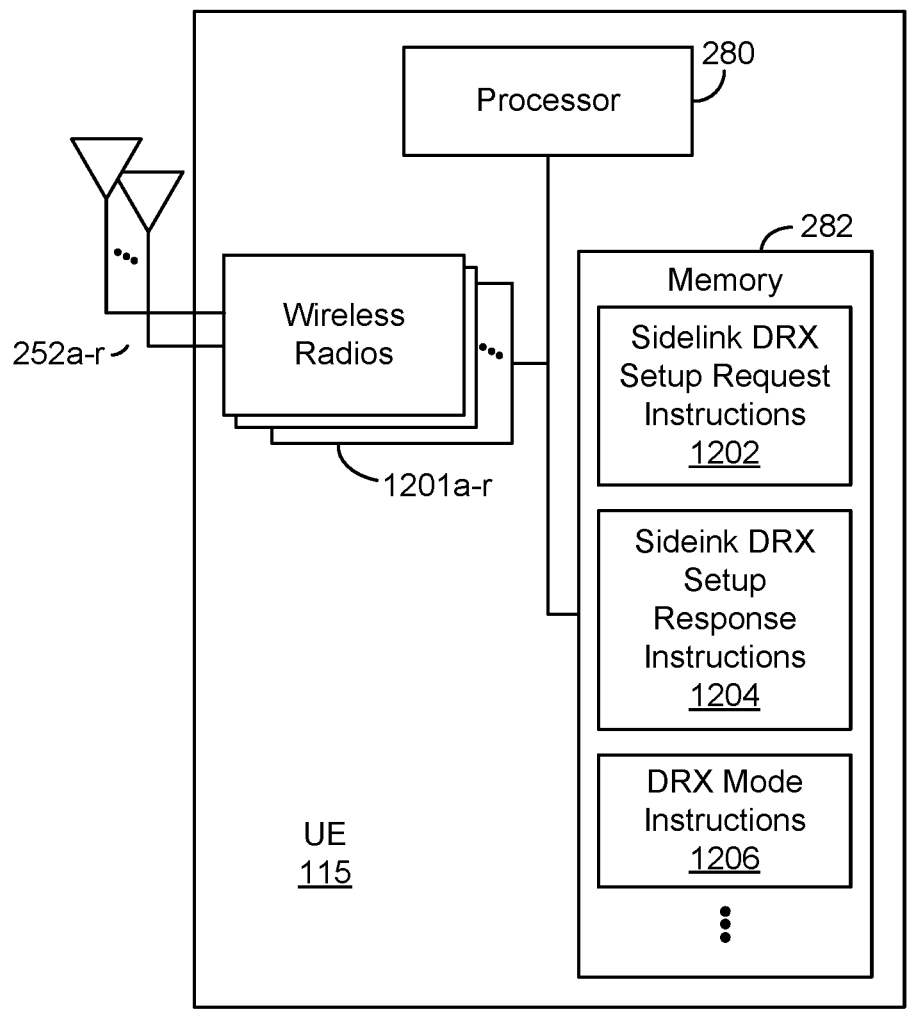
FIG. 12 is a block diagram of an example of a UE according to some aspects.

FIG. 12 is a block diagram illustrating an example of a UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 1201a-r and antennas 252a-r. The wireless radios 1201a-r may include one or more components or devices described herein, such as the modulator/demodulators 254a-r, the MIMO detector 256, the receive processor 258, the transmit processor 264, the TX MIMO processor 266, the transmitter 356x, the transmitter 356y, the receiver 358x, the receiver 358y, one or more other components or devices, or a combination thereof.

In some examples, the memory 282 may store instructions executable by one or more processors (e.g., the processor 280) to initiate, perform, or control one or more operations described herein. The one or more operations may include operations described with reference to the first UE 115x, operations described with reference to the second UE 115y, or both. For example, the memory 282 may store sidelink DRX setup request instructions 1202 executable by the processor 280 to initiate, perform, or control transmission of a sidelink DRX setup request, such as the sidelink DRX setup request 330. Alternatively or in addition, the memory 282 may store sidelink DRX setup request instructions 1204 executable by the processor 280 to initiate, perform, or control transmission of a sidelink DRX setup response, such as the sidelink DRX setup response 334. The memory 282 may also store DRX mode instructions 1206 executable by the processor 280 to initiate, perform, or control communication by the UE 115 based on one or more DRX configurations, such as any of the DRX configurations 320, 324, and 350.

To further illustrate some aspects of the disclosure, in a first aspect, an apparatus for wireless communication includes one or more transmitters configured to transmit, from a first user equipment (UE) to a second UE, a sidelink discontinuous reception (DRX) setup request. The sidelink DRX setup request indicates a first DRX configuration of the first UE for communication between the first UE and a first base station. The apparatus further includes one or more receivers configured to receive, from the second UE, a sidelink DRX setup response based on the sidelink DRX setup request. The sidelink DRX setup response indicates a second DRX configuration for communication between the first UE and the second UE. The one or more transmitters are further configured to transmit, to the first base station, an uplink message indicating the second DRX configuration, and the one or more receivers are further configured to receive, from the first base station, a downlink message indicating one or more adjusted parameters of the first DRX configuration that are based at least in part on the second DRX configuration.

In a second aspect alternatively or in addition to the first aspect, the second DRX configuration is based at least in part on a third DRX configuration of the second UE for communication between the second UE and a second base station.

In a third aspect alternatively or in addition to one or more of the first through second aspects, the one or more transmitters are further configured to transmit the sidelink DRX setup request during a radio resource control (RRC) connected mode of operation of the first UE and the second UE.

In a fourth aspect alternatively or in addition to one or more of the first through third aspects, the one or more transmitters are further configured to transmit the sidelink DRX setup request during a radio resource control (RRC) connected mode of operation of the first UE and during an RRC inactive mode or RRC idle mode of operation of the second UE.

In a fifth aspect alternatively or in addition to one or more of the first through fourth aspects, the first DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the first DRX configuration with one or more of the second DRX configuration or a third DRX configuration of the second UE for communication between the second UE and a second base station.

In a sixth aspect alternatively or in addition to one or more of the first through fifth aspects, the second DRX configuration is associated with one or more of a sidelink DRX start offset, a sidelink DRX cycle, or a sidelink DRX slot offset, and one or more of the sidelink DRX start offset, the sidelink DRX cycle, or the sidelink DRX slot offset are adjusted to align the second DRX configuration with one or more of the first DRX configuration or a third DRX configuration of the second UE for communication between the second UE and a second base station.

In a seventh aspect alternatively or in addition to one or more of the first through sixth aspects, the second UE is associated with a third DRX configuration for communication between the second UE and a second base station, the third DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the third DRX configuration with one or more of the first DRX configuration or the second DRX configuration.

In an eighth aspect alternatively or in addition to one or more of the first through seventh aspects, an apparatus for wireless communication includes a receiver configured to receive, from a first UE by a second UE, a sidelink DRX setup request. The sidelink DRX setup request indicates a first DRX configuration of the first UE for communication between the first UE and a first base station. The apparatus further incudes a transmitter configured to transmit, to the first UE from the second UE, a sidelink DRX setup response based on the sidelink DRX setup request. The sidelink DRX setup response indicates a second DRX configuration for communication between the first UE and the second UE. The transmitter is further configured to transmit the second DRX configuration to a first base station to enable the first base station to adjust the first DRX configuration.

In a ninth aspect alternatively or in addition to one or more of the first through eighth aspects, the second DRX configuration is based at least in part on a third DRX configuration of the second UE for communication between the second UE and a second base station.

In a tenth aspect alternatively or in addition to one or more of the first through ninth aspects, the transmitter is further configured to transmit an uplink message to the second base station, the uplink message indicates the first DRX configuration, and the receiver is further configured to receive, from the second base station, a downlink message indicating the second DRX configuration.

In an eleventh aspect alternatively or in addition to one or more of the first through tenth aspects, the receiver is further configured to receive the sidelink DRX setup request during a radio resource control (RRC) connected mode of operation of the first UE and the second UE.

In a twelfth aspect alternatively or in addition to one or more of the first through eleventh aspects, the receiver is further configured to receive the sidelink DRX setup request during a radio resource control (RRC) connected mode of operation of the first UE and during an RRC inactive mode or RRC idle mode of operation of the second UE.

In a thirteenth aspect alternatively or in addition to one or more of the first through twelfth aspects, the first DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the first DRX configuration with one or more of the second DRX configuration or a third DRX configuration of the second UE for communication between the second UE and a second base station.

In a fourteenth aspect alternatively or in addition to one or more of the first through thirteenth aspects, the second DRX configuration is associated with one or more of a sidelink DRX start offset, a sidelink DRX cycle, or a sidelink DRX slot offset, and one or more of the sidelink DRX start offset, the sidelink DRX cycle, or the sidelink DRX slot offset are adjusted to align the second DRX configuration with one or more of the first DRX configuration or a third DRX configuration of the second UE for communication between the second UE and a second base station.

In a fifteenth aspect alternatively or in addition to one or more of the first through fourteenth aspects, the second UE is associated with a third DRX configuration for communication between the second UE and a second base station, the third DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the third DRX configuration with one or more of the first DRX configuration or the second DRX configuration.

In a sixteenth aspect alternatively or in addition to one or more of the first through fifteenth aspects, a method of wireless communication performed by a first UE includes transmitting, to a second UE, a sidelink DRX setup request. The sidelink DRX setup request indicates a first DRX configuration of the first UE for communication between the first UE and a first base station. The method further includes receiving, from the second UE, a sidelink DRX setup response based on the sidelink DRX setup request. The sidelink DRX setup response indicates a second DRX configuration for communication between the first UE and the second UE. The method further includes transmitting, to the first base station, an uplink message indicating the second DRX configuration. The method further includes receiving, from the first base station, a downlink message indicating one or more adjusted parameters of the first DRX configuration that are based at least in part on the second DRX configuration.

In a seventeenth aspect alternatively or in addition to one or more of the first through sixteenth aspects, the second DRX configuration is based at least in part on a third DRX configuration of the second UE for communication between the second UE and a second base station.

In an eighteenth aspect alternatively or in addition to one or more of the first through seventeenth aspects, the first UE transmits the sidelink DRX setup request during a radio resource control (RRC) connected mode of operation of the first UE and the second UE.

In a nineteenth aspect alternatively or in addition to one or more of the first through eighteenth aspects, the first UE transmits the sidelink DRX setup request during a radio resource control (RRC) connected mode of operation of the first UE and during an RRC inactive mode or RRC idle mode of operation of the second UE.

In a twentieth aspect alternatively or in addition to one or more of the first through nineteenth aspects, the first DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the first DRX configuration with one or more of the second DRX configuration or a third DRX configuration of the second UE for communication between the second UE and a second base station.

In a twenty-first aspect alternatively or in addition to one or more of the first through twentieth aspects, the second DRX configuration is associated with one or more of a sidelink DRX start offset, a sidelink DRX cycle, or a sidelink DRX slot offset, and one or more of the sidelink DRX start offset, the sidelink DRX cycle, or the sidelink DRX slot offset are adjusted to align the second DRX configuration with one or more of the first DRX configuration or a third DRX configuration of the second UE for communication between the second UE and a second base station.

In a twenty-second aspect alternatively or in addition to one or more of the first through twenty-first aspects, the second UE is associated with a third DRX configuration for communication between the second UE and a second base station, the third DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the third DRX configuration with one or more of the first DRX configuration or the second DRX configuration.

In a twenty-third aspect alternatively or in addition to one or more of the first through twenty-second aspects, a method of wireless communication performed by a second UE includes receiving, from a first UE, a sidelink DRX setup request. The sidelink DRX setup request indicates a first DRX configuration of the first UE for communication between the first UE and a first base station. The method further includes transmitting, to the first UE, a sidelink DRX setup response based on the sidelink DRX setup request. The sidelink DRX setup response indicates a second DRX configuration for communication between the first UE and the second UE. The first UE transmits the second DRX configuration to a first base station to enable the first base station to adjust the first DRX configuration.

In a twenty-fourth aspect alternatively or in addition to one or more of the first through twenty-third aspects, the second DRX configuration is based at least in part on a third DRX configuration of the second UE for communication between the second UE and a second base station.

In a twenty-fifth aspect alternatively or in addition to one or more of the first through twenty-fourth aspects, the method includes transmitting an uplink message to the second base station, the uplink message indicates the first DRX configuration and receiving, from the second base station, a downlink message indicating the second DRX configuration.

In a twenty-sixth aspect alternatively or in addition to one or more of the first through twenty-fifth aspects, the second UE receives the sidelink DRX setup request during a radio resource control (RRC) connected mode of operation of the first UE and the second UE.

In a twenty-seventh aspect alternatively or in addition to one or more of the first through twenty-sixth aspects, the second UE receives the sidelink DRX setup request during a radio resource control (RRC) connected mode of operation of the first UE and during an RRC inactive mode or RRC idle mode of operation of the second UE.

In a twenty-eighth aspect alternatively or in addition to one or more of the first through twenty-seventh aspects, the first DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the first DRX configuration with one or more of the second DRX configuration or a third DRX configuration of the second UE for communication between the second UE and a second base station.

In a twenty-ninth aspect alternatively or in addition to one or more of the first through twenty-eighth aspects, the second DRX configuration is associated with one or more of a sidelink DRX start offset, a sidelink DRX cycle, or a sidelink DRX slot offset, and one or more of the sidelink DRX start offset, the sidelink DRX cycle, or the sidelink DRX slot offset are adjusted to align the second DRX configuration with one or more of the first DRX configuration or a third DRX configuration of the second UE for communication between the second UE and a second base station.

In a thirtieth aspect alternatively or in addition to one or more of the first through twenty-ninth aspects, the second UE is associated with a third DRX configuration for communication between the second UE and a second base station, the third DRX configuration is associated with one or more of a long cycle start offset, a short DRX cycle, a short cycle timer, or a DRX slot offset, and one or more of the long cycle start offset, the short DRX cycle, the short cycle timer, or the DRX slot offset are adjusted to align the third DRX configuration with one or more of the first DRX configuration or the second DRX configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Various illustrative logics, logical blocks, modules, circuits and operations described herein may be implemented as electronic hardware, computer software, or combinations of both. Hardware and software may be described generally, in terms of functionality, and illustrated in the various illustrative components, blocks, modules, circuits and processes described above. Whether such functionality is implemented in hardware or software may depend on the overall system.

A hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
    one or more transmitters configured to transmit, from a first user equipment (UE) to a second UE, a sidelink discontinuous reception (DRX) setup request, wherein the sidelink DRX setup request indicates a first DRX configuration of the first UE for communication between the first UE and a first base station; and
    one or more receivers configured to receive, from the second UE, a sidelink DRX setup response based on the sidelink DRX setup request, wherein the sidelink DRX setup response indicates a second DRX configuration for communication between the first UE and the second UE, wherein the second DRX configuration is based on the first DRX configuration and is further based on a third DRX configuration of the second UE for communication between the second UE and a second base station,
    wherein the one or more transmitters are further configured to transmit, to the first base station, an uplink message indicating the second DRX configuration, and
    wherein the one or more receivers are further configured to receive, from the first base station, a downlink message indicating one or more adjusted parameters of the first DRX configuration that are based at least in part on the second DRX configuration.

2. The apparatus of claim 1, wherein the one or more transmitters are further configured to transmit the sidelink DRX setup request during a radio resource control (RRC) connected mode of operation of the first UE and the second UE.

3. The apparatus of claim 1, wherein the one or more transmitters are further configured to transmit the sidelink DRX setup request during a radio resource control (RRC) connected mode of operation of the first UE and during an RRC inactive mode or RRC idle mode of operation of the second UE.

4. The apparatus of claim 1, wherein the first DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the first DRX configuration with one or more of the second DRX configuration or the third DRX configuration.

5. The apparatus of claim 1, wherein the second DRX configuration is associated with one or more of a sidelink DRX start offset, a sidelink DRX cycle, or a sidelink DRX slot offset, and wherein one or more of the sidelink DRX start offset, the sidelink DRX cycle, or the sidelink DRX slot offset are adjusted to align the second DRX configuration with one or more of the first DRX configuration or the third DRX configuration of the second UE for communication between the second UE and the second base station.

6. The apparatus of claim 1, wherein the third DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the third DRX configuration with one or more of the first DRX configuration or the second DRX configuration.

7. An apparatus for wireless communication, the apparatus comprising:
a receiver configured to receive, from a first user equipment (UE) by a second UE, a sidelink discontinuous reception (DRX) setup request, wherein the sidelink DRX setup request indicates a first DRX configuration of the first UE for communication between the first UE and a first base station; and
a transmitter configured to:
transmit, to the first UE from the second UE, a sidelink DRX setup response based on the sidelink DRX setup request, wherein the sidelink DRX setup response indicates a second DRX configuration for communication between the first UE and the second UE, and wherein the second DRX configuration is based on the first DRX configuration and is further based on a third DRX configuration of the second UE for communication between the second UE and a second base station; and
transmit the second DRX configuration to a first base station to enable the first base station to adjust the first DRX configuration.

8. The apparatus of claim 7, wherein the transmitter is further configured to transmit an uplink message to the second base station, wherein the uplink message indicates the first DRX configuration, and wherein the receiver is further configured to receive, from the second base station, a downlink message indicating the second DRX configuration.

9. The apparatus of claim 7, wherein the receiver is further configured to receive the sidelink DRX setup request during a radio resource control (RRC) connected mode of operation of the first UE and the second UE.

10. The apparatus of claim 7, wherein the receiver is further configured to receive the sidelink DRX setup request during a radio resource control (RRC) connected mode of operation of the first UE and during an RRC inactive mode or RRC idle mode of operation of the second UE.

11. The apparatus of claim 7, wherein the first DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the first DRX configuration with one or more of the second DRX configuration or the third DRX configuration.

12. The apparatus of claim 7, wherein the second DRX configuration is associated with one or more of a sidelink DRX start offset, a sidelink DRX cycle, or a sidelink DRX slot offset, and wherein one or more of the sidelink DRX start offset, the sidelink DRX cycle, or the sidelink DRX slot offset are adjusted to align the second DRX configuration with one or more of the first DRX configuration or the third DRX configuration.

13. The apparatus of claim 7, wherein the third DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the third DRX configuration with one or more of the first DRX configuration or the second DRX configuration.

14. A method of wireless communication performed by a first user equipment (UE), the method comprising:
transmitting, to a second UE, a sidelink discontinuous reception (DRX) setup request, wherein the sidelink DRX setup request indicates a first DRX configuration of the first UE for communication between the first UE and a first base station;
receiving, from the second UE, a sidelink DRX setup response based on the sidelink DRX setup request, wherein the sidelink DRX setup response indicates a second DRX configuration for communication between the first UE and the second UE, and wherein the second DRX configuration is based on the first DRX configuration and is further based on a third DRX configuration of the second UE for communication between the second UE and a second base station;
transmitting, to the first base station, an uplink message indicating the second DRX configuration; and
receiving, from the first base station, a downlink message indicating one or more adjusted parameters of the first DRX configuration that are based at least in part on the second DRX configuration.

15. The method of claim 14, wherein the first UE transmits the sidelink DRX setup request during a radio resource control (RRC) connected mode of operation of the first UE and the second UE.

16. The method of claim 14, wherein the first UE transmits the sidelink DRX setup request during a radio resource control (RRC) connected mode of operation of the first UE and during an RRC inactive mode or RRC idle mode of operation of the second UE.

17. The method of claim 14, wherein the first DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the first DRX configuration with one or more of the second DRX configuration or the third DRX configuration.

18. The method of claim 14, wherein the second DRX configuration is associated with one or more of a sidelink DRX start offset, a sidelink DRX cycle, or a sidelink DRX slot offset, and wherein one or more of the sidelink DRX start offset, the sidelink DRX cycle, or the sidelink DRX slot offset are adjusted to align the second DRX configuration with one or more of the first DRX configuration or the third DRX configuration.

19. The method of claim 14, wherein the third DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the third DRX configuration with one or more of the first DRX configuration or the second DRX configuration.

20. A method of wireless communication performed by a second user equipment (UE), the method comprising:
   receiving, from a first UE, a sidelink discontinuous reception (DRX) setup request, wherein the sidelink DRX setup request indicates a first DRX configuration of the first UE for communication between the first UE and a first base station; and
   transmitting, to the first UE, a sidelink DRX setup response based on the sidelink DRX setup request, wherein the sidelink DRX setup response indicates a second DRX configuration for communication between the first UE and the second UE, wherein the second DRX configuration is based on the first DRX configuration and is further based on a third DRX configuration of the second UE for communication between the second UE and a second base station, and wherein the first UE transmits the second DRX configuration to a first base station to enable the first base station to adjust the first DRX configuration.

21. The method of claim 20, further comprising:
   transmitting an uplink message to the second base station, wherein the uplink message indicates the first DRX configuration; and
   receiving, from the second base station, a downlink message indicating the second DRX configuration.

22. The method of claim 20, wherein the second UE receives the sidelink DRX setup request during a radio resource control (RRC) connected mode of operation of the first UE and the second UE.

23. The method of claim 20, wherein the second UE receives the sidelink DRX setup request during a radio resource control (RRC) connected mode of operation of the first UE and during an RRC inactive mode or RRC idle mode of operation of the second UE.

24. The method of claim 20, wherein the first DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the first DRX configuration with one or more of the second DRX configuration or the third DRX configuration.

25. The method of claim 20, wherein the second DRX configuration is associated with one or more of a sidelink DRX start offset, a sidelink DRX cycle, or a sidelink DRX slot offset, and wherein one or more of the sidelink DRX start offset, the sidelink DRX cycle, or the sidelink DRX slot offset are adjusted to align the second DRX configuration with one or more of the first DRX configuration or the third DRX configuration.

26. The method of claim 20, wherein the third DRX configuration is associated with one or more of a long cycle start offset, a short DRX cycle, a short cycle timer, or a DRX slot offset, and wherein one or more of the long cycle start offset, the short DRX cycle, the short cycle timer, or the DRX slot offset are adjusted to align the third DRX configuration with one or more of the first DRX configuration or the second DRX configuration.

27. The method of claim 20, further comprising determining the second DRX configuration, wherein determining the second DRX configuration includes:
   aligning at least a first time interval associated with the first DRX configuration with at least a second time interval associated with the second DRX configuration; and
   aligning at least the second time interval associated with the second DRX configuration with at least a third time interval associated with the third DRX configuration.

28. The method of claim 27, wherein the third time interval has a first amount of overlap with the second time interval prior to aligning the second time interval with the third time interval, and wherein the third time interval has a second amount of overlap with the second time interval that is less than the first amount of overlap after aligning the second time interval with the third time interval.

* * * * *